US011686416B2

(12) United States Patent
Al Shammari

(10) Patent No.: US 11,686,416 B2
(45) Date of Patent: Jun. 27, 2023

(54) TEMPORARY TRAP DOOR CAP

(71) Applicant: SAUDI ARABIAN OIL COMPANY, Dhahran (SA)

(72) Inventor: Mohammed N Al Shammari, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 138 days.

(21) Appl. No.: 17/016,892

(22) Filed: Sep. 10, 2020

(65) Prior Publication Data

US 2022/0074537 A1    Mar. 10, 2022

(51) Int. Cl.
*F16L 57/00* (2006.01)
*F16L 55/16* (2006.01)
*F16L 55/46* (2006.01)

(52) U.S. Cl.
CPC ........... *F16L 55/1612* (2013.01); *F16L 55/46* (2013.01)

(58) Field of Classification Search
CPC ... F16L 55/1612; F16L 55/46; F16L 55/1152; F16L 55/1705; F16L 55/178
USPC ........................................ 138/96 R, 96 T, 99
See application file for complete search history.

(56) References Cited

U.S. PATENT DOCUMENTS

| | | | |
|---|---|---|---|
| 1,593,041 A * | 7/1926 | Stewart | F16L 23/036 292/256.73 |
| 2,390,445 A * | 12/1945 | Mercier | F16J 10/02 285/422 |
| 2,999,515 A * | 9/1961 | Watson | F16L 55/172 285/373 |
| 3,525,366 A * | 8/1970 | Frees | F16L 55/1152 138/96 T |
| 3,802,466 A | 4/1974 | Panella | |
| 4,237,936 A * | 12/1980 | Lollis | F16L 55/115 138/90 |

(Continued)

FOREIGN PATENT DOCUMENTS

DE    9412012 U1    9/1994
DE   29511924 U1    9/1995
(Continued)

OTHER PUBLICATIONS

Warriner, Duncan, "Recent Innovations and the Importance of Planned Maintenance & Inspection Procedures", SPE 117988, Society of Petroleum Engineers, Nov. 2008 (8 pages).

(Continued)

*Primary Examiner* — James F Hook
(74) *Attorney, Agent, or Firm* — Osha Bergman Watanabe & Burton LLP

(57) ABSTRACT

A trap door cap for sealing around a trap door of a trap is disclosed. The canister includes a closed end and side walls extending from the closed end, wherein the side walls and the closed end together define a cup-shaped body having an open end opposite the closed end. The trap door cap further includes a seal configured to selectively apply a pressure-tight seal around an exterior surface of the trap at a longitudinal location of the trap inward of the trap door and a pressure-tight connection between the seal and the open end of the cup-shaped body, wherein the side walls, the closed end, the seal, and the pressure-tight connection together form a pressure-tight inner volume within the canister.

19 Claims, 5 Drawing Sheets

(56) References Cited

U.S. PATENT DOCUMENTS

| | | | | |
|---|---|---|---|---|
| 4,652,023 | A | * | 3/1987 | Timmons .............. F16L 55/172 |
| | | | | 285/373 |
| 5,219,244 | A | | 6/1993 | Skeels |
| 5,610,324 | A | * | 3/1997 | Lawson ................ G01M 3/042 |
| | | | | 73/40 |
| 5,850,854 | A | * | 12/1998 | Carroll ................. F16L 55/115 |
| | | | | 138/158 |
| 5,913,637 | A | | 6/1999 | Rajabali et al. |
| 6,663,149 | B1 | | 12/2003 | White |
| 2012/0054978 | A1 | | 3/2012 | Nelson et al. |
| 2012/0131758 | A1 | | 5/2012 | Bacon et al. |
| 2012/0234422 | A1 | | 9/2012 | Pargmann |
| 2018/0135792 | A1 | | 5/2018 | Halim et al. |
| 2019/0063663 | A1 | | 2/2019 | Poe et al. |
| 2019/0293226 | A1 | | 9/2019 | Genta |

FOREIGN PATENT DOCUMENTS

| | | |
|---|---|---|
| EP | 3356719 B1 | 11/2020 |
| GB | 1278492 A | 6/1972 |

OTHER PUBLICATIONS

"Smart Plug Isolation Technology", Product Brochure, T.D. Williamson, 2014, URL: <http://www.tdwilliamson.com/sites/default/files/2020-05/SmartPlugIsolationTechnology-Brochure-LTR-052014-web.pdf> (5 pages).

"Tecno Plug: Non-intrusive Inline Isolation", STATS Group: Managing Pressure, Minimising Risk, STATS (UK) LTD, Issue 3, Mar. 2019, URL: <https://www.statsgroup.com/perch/resources/tecno-plug-brochure-uk-issue-3-web-2.pdf> (8 pages).

International Search Report and Written Opinion issued in Application No. PCT/US2021/049631, dated Feb. 7, 2022 (19 pages).

\* cited by examiner

TEMPORARY TRAP DOOR CAP

BACKGROUND

In the operation and maintaining of a pipeline, whether used in the oil and gas industry, in municipal water-supply systems, or for other purposes, it is frequently necessary to access the interior of the pipeline. Access may be needed to inspect the pipeline and repair, replace or hydraulically isolate damaged sections. One method of accessing the interior of a pipeline for these purposes is to insert one, or more, mechanical devices known as "pigs" into the pipeline. These pigs may carry sensors for inspecting the interior of the pipeline. Additionally, or alternatively, they may carry devices for repairing the interior of the pipeline. In other situations, the pigs may be capable of expanding on command to hydraulically block the pipeline.

The pigs may be introduced into the pipeline through a device known as a "pig trap" or simply a "trap." FIG. 1 depicts an example of a trap (100). The trap (100) includes one or more hydraulic isolation valves (110) that connect the trap (100) to the pipeline (112) at one end, and to the narrow end of a truncated tapered cylinder (114) at the other end. The hydraulic isolation valve (110) is intended to hydraulically isolate the pipeline (112) from the body of the trap (102) when closed.

The broad end of the truncated tapered cylinder (114) connects to one end of the body of the trap (102). The other end of the body of the trap (102) is closed with a trap door (104). The trap door (104) may be connected to the body of the trap (102) with a mechanism (106) for supporting the trap door when opened. In some situations, the mechanism (106) for supporting the trap door when open may be a hinge mechanism. In addition, the trap door (104) may additionally include a clasp mechanism (108) for securing the trap door (104). When closed and secured the trap door (104) in intended to contain pressure within the pipeline and prevent fluid in the pipeline from leaking to the exterior of the trap (100). Further, additional conduits (116) may be attached to the body of the trap (102) to selectably drain the trap (100) when the hydraulic isolation valve (110) is closed.

In some situations, the pig may be introduced into the pipeline (112) through the trap (100) by first closing the hydraulic isolation valve (110). The trap (102) may then be drained using the draining conduits (116) and the trap door (104) opened by unfastening the clasp (108) and swinging the trap door (104) open. The trap door is held by supporting mechanisms (112). The pig may then be inserted into the body of the trap (102) and the trap door (104) closed and secured with the clasp (108). The hydraulic isolation valve (110) may then be opened to establish an open conduit to the pipeline (112) and allow passage of the pig into the pipeline (112).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a trap door cap for sealing around a trap door of a trap is disclosed. The canister includes a closed end and side walls extending from the closed end, wherein the side walls and the closed end together define a cup-shaped body having an open end opposite the closed end. The trap door cap further includes a seal configured to selectively apply a pressure-tight seal around an exterior surface of the trap at a longitudinal location of the trap inward of the trap door and a pressure-tight connection between the seal and the open end of the cup-shaped body, wherein the side walls, the closed end, the seal, and the pressure-tight connection together form a pressure-tight inner volume within the canister.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In some cases in which a trap is employed on a pipeline, the effectiveness of the seal between the trap door (104) and the body of the trap (102) and the effectiveness of the hydraulic isolation valve (110) may become compromised, allowing the contents of the pipeline (112) to leak into the exterior environment. This leaking oil or gas may pose a significant environmental hazard in the vicinity of the trap. In addition, the leak may pose a significant safety hazard, as both oil and gas are highly flammable. Thus, it is often desirable to have access to an apparatus, and a method of use for the apparatus, to temporarily prevent or contain such a leak until permanent remediation measures can be planned, scheduled, and executed.

Figure 1:
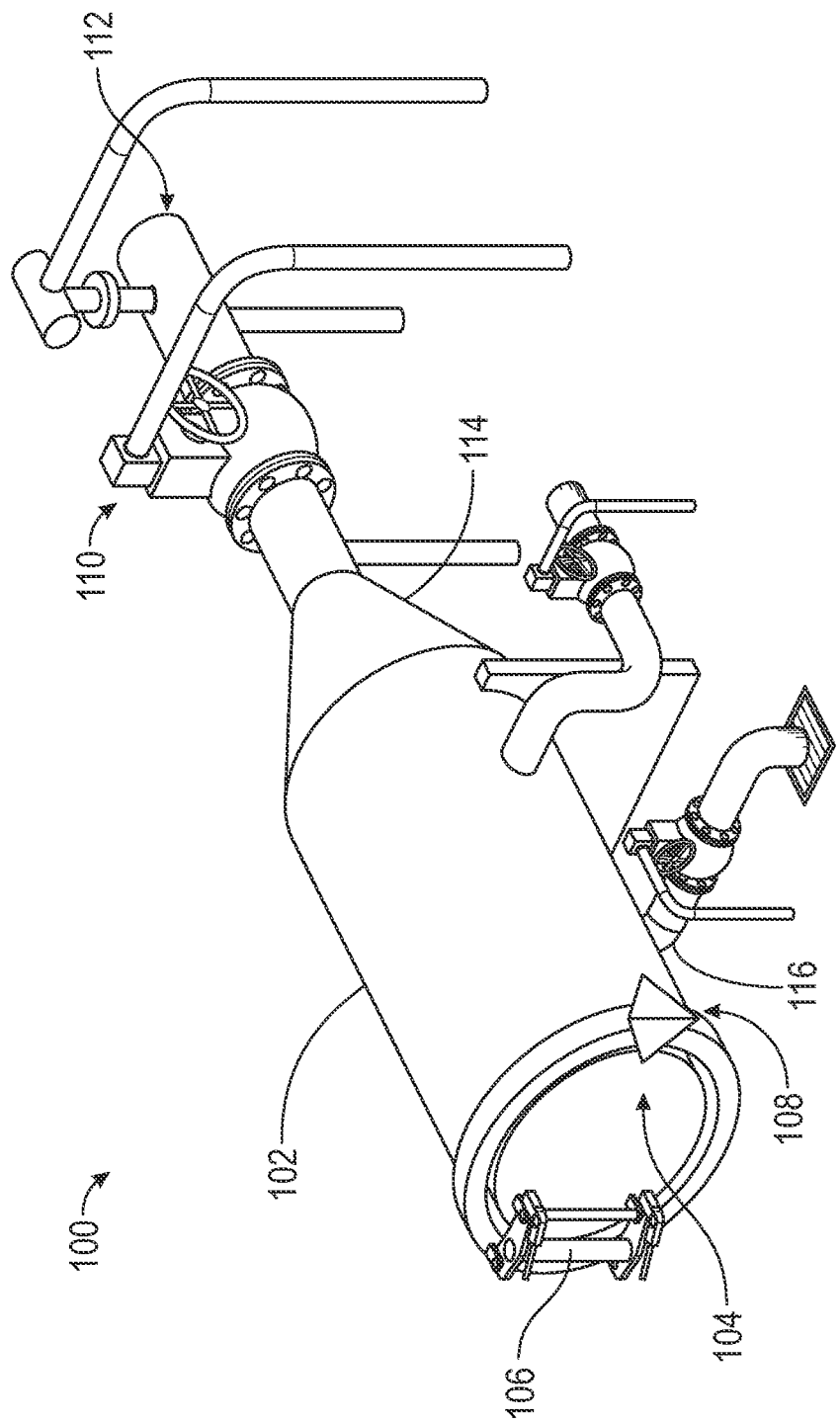
FIG. 1 shows a trap and trap door.
Figure 2:
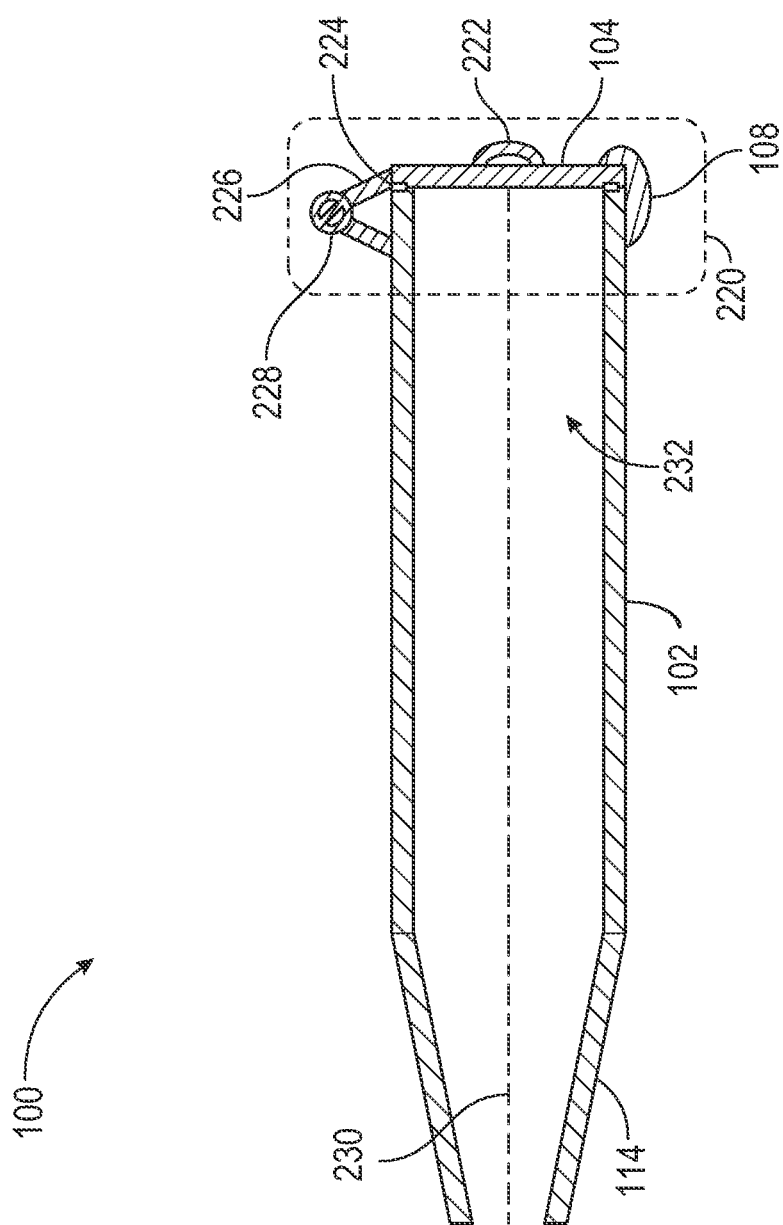
FIG. 2 shows a cross-sectional view of some aspects of a trap and trap door.

FIG. 2 depicts a cross-sectional view of a trap (100) and trap door (104) in a plane containing the longitudinal axis of the trap (100). The body of the trap (102) may be a cylindrical canister connected at one end to a truncated tapered cylinder (114). The other end of the trap (100) is terminated by a trap door assembly (220). The trap door assembly (220) may comprise a trap door (104) which may have a handle (222) to facilitate opening and closing the trap door (104). Additionally, the trap door (104) may be attached to the body of the trap (102) with a hinge (226) and pivot (228) assembly that may support the trap door (104) when open, and when opening and closing. Further, a clasp (108) may be attached to the trap door (104) to securely hold the trap door (104) closed. The trap door assembly (220) may additionally comprise a sealing material (224) to seal the interior of the trap (232) pressure-tight when the trap door (104) is closed. This seal may take the form of an o-ring composed of an elastomer material.

As FIG. 2 illustrates, in some embodiments, that the elements of the trap door assembly (220) may extend in a lateral direction beyond the external radius of the body of the trap (102). In particular, the hinge (226), pivot (228) and clasp (108) may be located wholly, or in part, further from the axis (230) of the body of the trap (102) than the external radius of the body of the trap (102).

Figure 3:
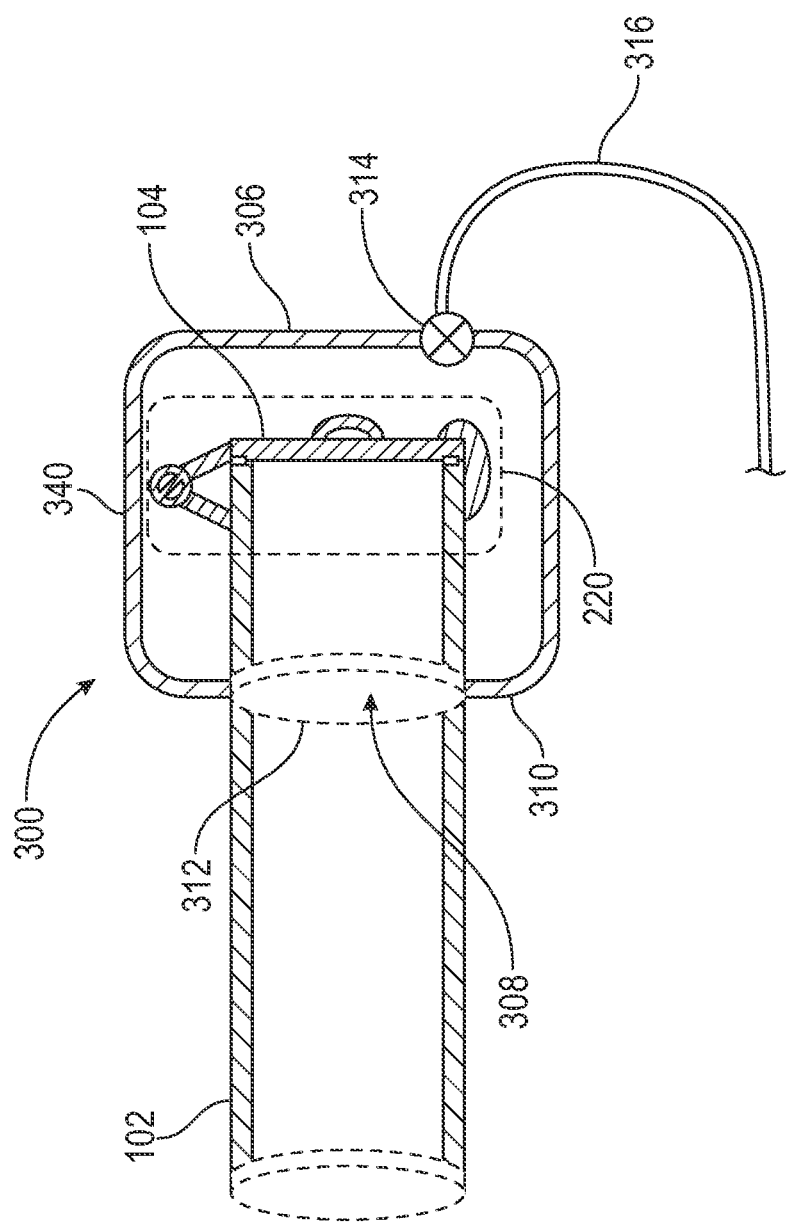
FIG. 3 shows an embodiment of a trap, trap door and temporary trap door cap.

FIG. 3 illustrates a temporary trap door cap (300) in accordance with one or more embodiments. The temporary trap door cap (300) includes an essentially cylindrical canister (340) with a closed end (306) and an open end (308). The lateral dimension of the canister is large enough at least in some locations to enclose the trap door assembly (220). In some embodiments, the open end (308) may have an annular rim (310) which may be compressed against the body of the trap (102) to form a pressure-tight seal. In some embodiments, the annular rim (310) may be coated, or partially coated, with a sealing material (312) to ensure the enclosed volume is pressure-tight.

The sealing material (312) that may coat the surface of the annular rim (310) that compresses against the body of the trap (102) may be an elastomer material attached in a non-transitory manner to the annular rim (310). Alternatively, a sealing material (312) may be applied to the annular rim (310), or to the body of the trap (102), during the installation of the temporary trap door cap (300). The sealing material (312) may also be an adhesive compound applied to the annular rim (310), or to the body of the trap where the annular rim (310) is compressed against the body of the trap (102).

The annular rim (310) may be compressed against the body of the trap (102) in any number of ways familiar to one skilled in the art. For example, the compressing may occur because the elastic properties of the material from which the canister (340), or from which the annular rim (310), is constructed cause it to contract on to the body of the trap (102) when it is not stretched with an external force. Alternatively, the compressing may be affected using a tape, or strap, or band, around the annular rim (310) and the body of the trap (102) and tightened by any number of methods familiar to one skilled in the art.

In one embodiment, one or more of the elements comprising the temporary trap door cap including, without limitation, the canister (340), the annular rim (310), and the closed end (306) may be constructed from an elastic material. The elastic material may be deformed by the application of external forces and returns to its original shape when the external forces are relaxed. In this embodiment, the temporary trap door cap (300) may be installed by applying external forces to deform the temporary trap door cap (300); sliding the temporary trap door cap (300) over the trap door assembly (220) and positioning the temporary trap door cap (300) to enclose the trap door (104) and the trap door assembly (220); then relaxing the external forces to allow the annular rim (310) to compress around the body of the trap (102).

Additionally, in some embodiments, a controllable valve (314) may be mounted on the wall of the canister (340) to allow fluid to flow in a controlled manner from within the temporary trap door cap (300) into an attached conduit (316) or into the surrounding environment. The attached conduit (316) may lead to temporary storage tanks, which may be static or mobile in nature. Alternatively, the attached conduit (316) may lead to the pipeline and may be attached to the pipeline with at least one controllable valve. Further, the attached conduit (316) may be attached to one or more pumps and these pumps attached to storage tanks, or to a pipeline. In some embodiments, this combination of conduit, pump, and valves is intended to facilitate the draining of the pressure-tight volume encapsulating the trap door assembly (220), or to facilitate the reduction of pressure within the pressure-tight volume encapsulating the trap door assembly (220).

Figure 4:
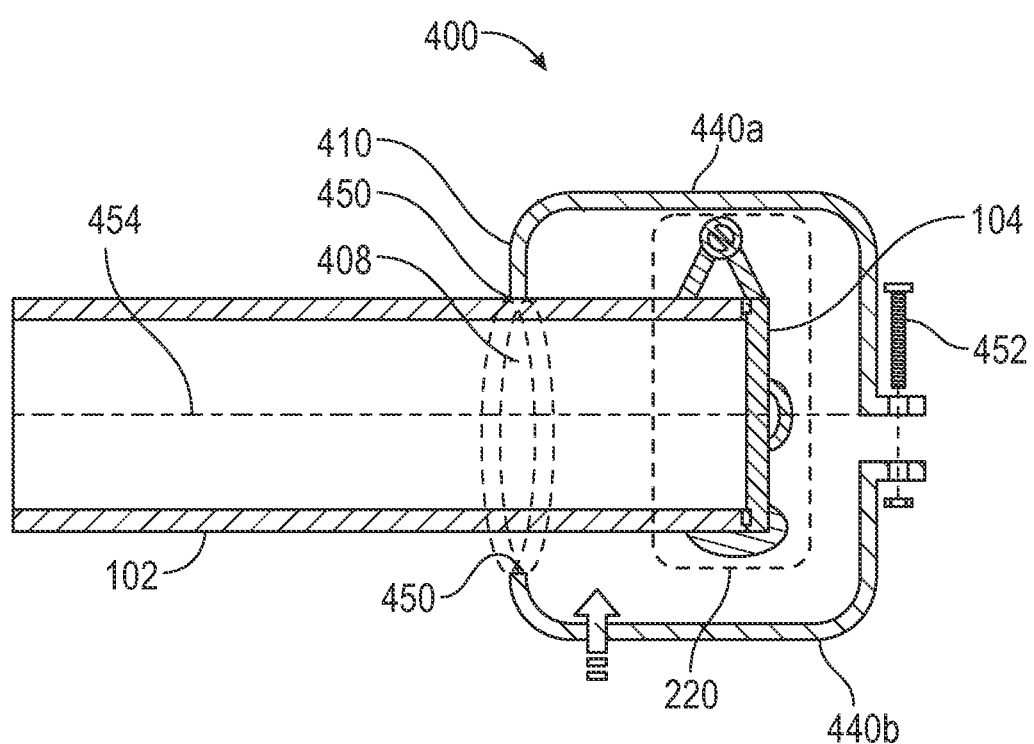
FIG. 4 shows an example of the installation a temporary trap door cap, according to one embodiment.

FIG. 4 shows another embodiment of the design and installation of the temporary trap door cap (400). In this example, the canister is composed of a first component (440a) and a second component (440b) which, when connected together form a canister with a closed end, and an open end (408) with an annular rim (410). In some embodiments, the two components are formed by dividing the temporary trap door cap (400) along a plane containing the longitudinal axis of the cap (454) to produce two symmetrical components (440a, 440b). In other embodiments, the first component (440a) and the second component (440b) may not be symmetrical.

Additionally, the first component (440a) and the second component (440b) may be equipped with a one or more fasteners (452) to securely connect the first component (440a) to the second component (440b). These fasteners may include screws, pins, bolts and nuts (452), rivets, clamps, clasps, hinges, bands, tapes, ropes, adhesive, glue, solder, or welds. This list is not intended to be exhaustive and one skilled in the art may easily identify other types of fasteners. In some embodiments, only one type of fastener may be used but, in other embodiments, a variety of different fastener types may be used in combination.

The embodiment depicted in FIG. 4 may be installed on a first side by placing the first component (440a) over the trap door assembly (420) such that an annular rim of the first component (440a) is in contact with the body of the trap (102). Additionally, the inner surface (450) of the annular rim (410) of the first component (440a) may be coated, or partially coated, with a sealing material, such as an elastomer or adhesive, before the contact is established. Next, the second component (440b) is installed on a second side, over the trap door assembly (220) and positioned such that the annular rim (410) of the second component (440b) is in contact with the body of the trap (102).

Additionally, the inner surface of the annular rim of the second component (440b) may be coated, or partially coated, with a sealing material such as an elastomer or adhesive before the contact is established. Furthermore, the surfaces of the first component (440a) that will be placed in contact with the surfaces of second component (440b) may be coated, or partially coated, with a sealing material such as an elastomer or adhesive before the contact between the first and second components is created. Similarly, the surfaces of the second component (440b) that will be placed in contact with the surfaces of first component (440a) may be coated, or partially coated, with a sealing material such as an elastomer or adhesive before the contact between the first and second components is created. Similarly, the surfaces of both components that will be placed in contact may be coated, or partially coated, with a sealing material such as an elastomer or adhesive before the contact between the first and second components is created.

The first component and the second component may be compressed against one another, and the annular rims (410) of the first and second component may be compressed against the body of the trap (102) by tightening the fasteners, such as the nut and bolt (452), provided for this purpose to create a pressure-tight seal enclosing the trap door assembly (220).

Figure 5A:
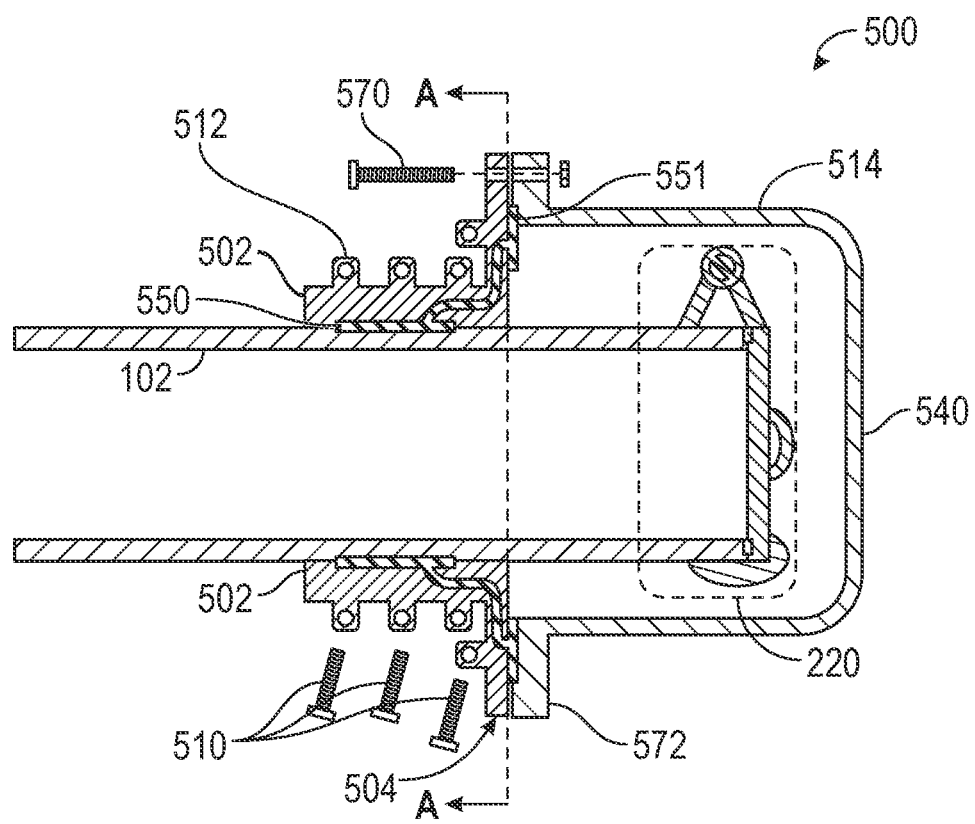
FIGS. 5A and 5B show an example of the installation a temporary trap door cap, according to another embodiment.
Figure 5B:
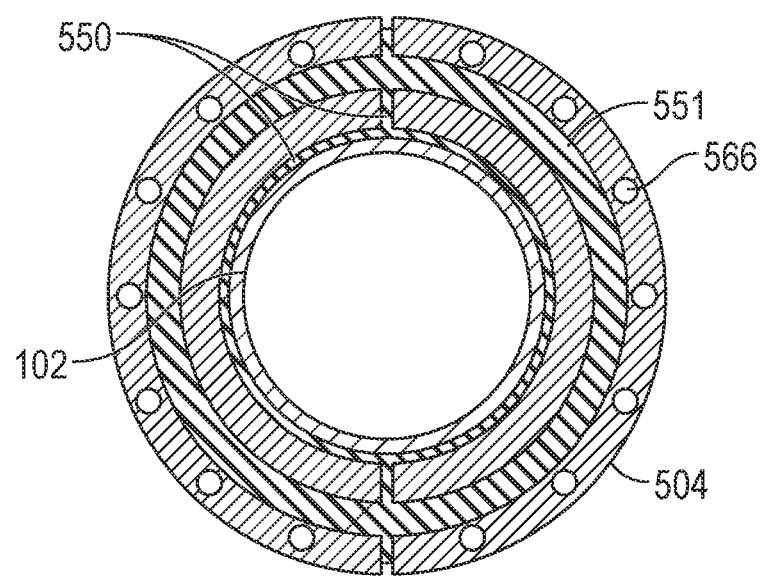

FIGS. 5A and 5B show another embodiment of a temporary trap door cap (500). This embodiment comprises a clamshell clamp (502) including a flange (504) that when installed extends laterally away from the body of the trap (102). The clamshell clamp (502) may further comprise two essentially symmetric halves which when installed may be compressed against the body of the trap (102) to firmly attach thereto. Further, in some embodiments, a first sealing material (550), such as an elastomer or an adhesive, may be introduced between the body of the clamshell clamp (502) and the clamshell clamp (502). The two essentially symmetric halves of the clamshell clamp (502) may be compressed against the body of the trap (102) using one or more clamshell fasteners (510), and in some cases clamshell fastener receptacles (512), to securely connect the first clamshell part to the second clamshell part. These fasteners may include screws, pins, bolts and nuts, rivets, clamps, clasps, hinges, bands, tapes, ropes, adhesive, glue, solder, or welds. This list is not intended to be exhaustive and one skilled in the art may easily identify other types of fasteners. In some embodiments, only one type of clamshell fastener may be used but, in other embodiments, a variety of different fastener types may be used in combination.

FIG. 5A further depicts a canister (514) with a closed end (540) and a flange (572) at the open end. The canister (514) may have a diameter that is sufficiently large that the canister (514) may fit over the trap door assembly (220) and the flange of the canister (572) may be brought into proximity to the clamshell flange (504). In some embodiments, a second sealing material (551) may coat, or partially coat, one or both of the canister flange (572) and the clamshell flange (504). Alternatively, a second sealing material (551) may be inserted between the canister flange (572) and the clamshell flange (504). In each embodiment described in this paragraph the canister flange (574) and the clamshell flange (504) may then be compressed together. One or more flange fasteners (570) may be used to produce the compression. These flange fasteners (570) may include screws, pins, bolts and nuts, rivets, clamps, clasps, hinges, bands, tapes, ropes, adhesive, glue, solder, or welds. This list is not intended to be exhaustive and one skilled in the art may easily identify other types of fasteners. In some embodiments, only one type of flange fastener (570) may be used, but in other embodiments a variety of different fastener types may be used in combination.

FIG. 5B shows the embodiment displayed in FIG. 5A viewed from an orthogonal perspective. The view showed in FIG. 5B represents the cross-section indicated by the dashed line A-A in FIG. 5A. In particular, FIG. 5B shows the clamshell clamp (502) from an orthogonal perspective.

FIG. 5B shows the body of the trap (102) surrounded by a first sealing material (550). This first sealing material (550) may extend to the faces of the two halves of the clamshell clamp (502) that are compressed into contact with one another. The face of the clamshell flange (504) may be coated, or partially coated, with a second sealing material (551). Further, the clamshell flange (504) may be penetrated by flange fastener receptacle ("bolt holes") (566) to receive the flange fasteners (570) shown in FIG. 5A that when tightened compress the clamshell flange (504) and the canister flange (572) together to form a pressure-tight seal.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A trap door cap for sealing a trap, wherein the trap comprises a trap body having a longitudinal axis and a trap door assembly disposed at an open end of the trap body, wherein the trap door assembly comprises a trap door arranged to selectively seal the open end of the trap body and a connection mechanism arranged to secure the trap door to the open end of the trap body, wherein the connection mechanism has a maximum external diameter that exceeds an external diameter of the trap body, the trap door cap comprising:
   a canister comprising a closed end and side walls extending from the closed end, wherein the side walls and the closed end together define a cup-shaped body having an open end opposite the closed end and wherein an inner diameter of the canister exceeds the maximum external diameter of the connection mechanism;
   a seal configured to selectively apply a pressure-tight seal around a complete circumference of an exterior surface of the trap body at a longitudinal location of the trap body inward of the trap door, wherein a seal diameter of the seal at the longitudinal location is less than the inner diameter of the canister and wherein the exterior surface of the trap body at the longitudinal location is exposed when the trap door is closed; and
   a pressure-tight connection between the seal and the open end of the cup-shaped body;
   wherein, when the trap door cap is placed over the trap door assembly, the side walls, the closed end, the seal, and the pressure-tight connection together form a pressure-tight inner volume enclosing the trap door assembly within the canister.

2. The trap door cap of claim 1, further comprising a controllable valve mounted on the canister and providing selective communication between the pressure-tight inner volume and an exterior of the canister.

3. The trap door cap of claim 1, wherein the seal comprises a deformable annular rim.

4. The trap door cap of claim 3, wherein the deformable annular rim comprises an elastically deformable material.

5. The trap door cap of claim 3, further comprising a sealing material disposed on a surface of the annular rim that contacts the exterior surface of the trap body.

6. The trap door cap of claim 3, wherein the pressure-tight connection comprises an integral connection between the deformable annular rim and the open end of the canister.

7. The trap door cap of claim 6, wherein the canister and the deformable annular rim comprise an elastically deformable material.

8. The trap door cap of claim 1, wherein the canister comprises a first component, a second component, and a fastener that selectively secures the first component to the second component.

9. The trap door cap of claim 8, wherein the first component and the second component are divided along a plane extending through the open end and the closed end of the cup-shaped body.

10. The trap door cap of claim 9, wherein the first component and the second component are symmetrical.

11. The trap door cap of claim 8, wherein the seal comprises a first component annular rim portion and a second component annular rim portion.

12. The trap door cap of claim 11, further comprising a sealing material disposed on a surface of the first component annular rim portion and the second component annular rim portion that contact the exterior surface of the trap.

13. The trap door cap of claim 1, wherein the seal comprises a clamshell clamp removably clampable to the exterior surface of the trap body at the longitudinal location.

14. The trap door cap of claim 13, wherein the clamshell clamp comprises a first clamshell part, a second clamshell part, and a fastener to selectively fasten the first clamshell part to the second clamshell part.

15. The trap door cap of claim 14, wherein the fastener comprises a plurality of bolts and wherein a tightness of the plurality of bolts controls a compression of the clamshell clamp.

16. The trap door cap of claim 13, wherein the pressure-tight connection comprises a first flange extending laterally from the clamshell clamp, a second flange formed on the open end of the canister, and a flange connector to selectively fasten the first flange to the second flange.

17. The trap door cap of claim 16, further comprising a sealing material disposed between the first flange and the second flange.

18. The trap door cap of claim 16, wherein the flange connector comprises a plurality of bolts and wherein a tightness of the plurality of bolts controls a compression of the first flange to the second flange.

19. The trap door cap of claim 13, further comprising a sealing material disposed on a surface of the clamshell clamp that contacts the exterior surface of the trap body.

\* \* \* \* \*